(12) United States Patent
Ichikawa et al.

(10) Patent No.: US 10,011,275 B2
(45) Date of Patent: Jul. 3, 2018

(54) COLLISION PREVENTION DEVICE

(71) Applicant: Panasonic Intellectual Property Management Co., Ltd., Osaka (JP)

(72) Inventors: Toru Ichikawa, Kanagawa (JP); Yasunori Shiga, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/454,753

(22) Filed: Mar. 9, 2017

(65) Prior Publication Data

US 2017/0197616 A1 Jul. 13, 2017

Related U.S. Application Data

(63) Continuation of application No. PCT/JP2015/003498, filed on Jul. 10, 2015.

(30) Foreign Application Priority Data

Sep. 12, 2014 (JP) .................................. 2014-185909

(51) Int. Cl.
*B60W 30/085* (2012.01)
*B60W 10/18* (2012.01)
*B60W 30/09* (2012.01)

(52) U.S. Cl.
CPC .......... *B60W 30/085* (2013.01); *B60W 10/18* (2013.01); *B60W 30/09* (2013.01);
(Continued)

(58) Field of Classification Search
CPC .... B60W 30/085; B60W 10/18; B60W 30/09; B60W 2550/10; B60W 2420/54; B60W 2420/52
(Continued)

(56) References Cited

U.S. PATENT DOCUMENTS

2012/0327239 A1 12/2012 Inoue et al.
2014/0222289 A1* 8/2014 Fujishiro .................. B60T 7/22
701/41

FOREIGN PATENT DOCUMENTS

JP 59-134038 A 8/1984
JP 2000-346936 A 12/2000
(Continued)

OTHER PUBLICATIONS

International Search Report of PCT application No. PCT/JP2015/003498 dated Sep. 8, 2015.

*Primary Examiner* — Marthe Y Marc-Coleman
(74) *Attorney, Agent, or Firm* — Seed IP Law Group LLP

(57) ABSTRACT

A collision prevention device is mounted on a vehicle and prevents collision against an obstacle by controlling a driving system of the vehicle. This collision prevention device includes an obstacle sensor, an obstacle detection area setting unit, a detector and a vehicle controller. The obstacle sensor transmits one of a light wave, a radio wave and an ultrasonic wave to a predetermined obstacle detection area, and receives a reflected wave of one of the light wave, the radio wave and the ultrasonic wave. The obstacle detection area setting unit sets the obstacle detection area of the obstacle sensor. The detector detects the obstacle in the obstacle detection area based on a detection result of the obstacle sensor. The vehicle controller controls the driving system of the vehicle based on a result of the detection of the detector, and according to the obstacle detection area set by the obstacle detection area setting unit.

9 Claims, 5 Drawing Sheets

(52) U.S. Cl.
CPC ..... *B60W 2420/52* (2013.01); *B60W 2420/54* (2013.01); *B60W 2550/10* (2013.01)

(58) Field of Classification Search
USPC ..................................................... 701/70, 41
See application file for complete search history.

(56) References Cited

FOREIGN PATENT DOCUMENTS

| | | |
|---|---|---|
| JP | 2012-215489 A | 11/2012 |
| WO | 2011/145141 A1 | 11/2011 |

\* cited by examiner

COLLISION PREVENTION DEVICE

TECHNICAL FIELD

The present disclosure relates to a collision prevention device which prevents collision against obstacles present around a vehicle.

BACKGROUND ART

Conventionally, devices which each prevent collision by detecting obstacles present around a vehicle by using ultrasonic sensors (also referred to as sonars) mounted on the vehicle are known (see, for example, PTL 1).

The ultrasonic sensors can detect a distance to each obstacle based on a time from transmission to reception and a sonic speed by transmitting an ultrasonic wave and then receiving the returning ultrasonic wave reflected by the obstacle. By activating a plurality of ultrasonic sensors in one detection area and causing each ultrasonic sensor to measure a distance to the obstacle, it is possible to detect a position of each obstacle by trilateration.

When an obstacle is detected by using ultrasonic sensors, a curbstone which protrudes from a road surface is erroneously detected as the obstacle in some cases. A technique which controls detection areas of ultrasonic sensors to prevent this erroneous detection is known (see, for example, PTL 2).

According to PTL 2, when a reception gain of a distance sensor can be controlled and a vehicle posture changes, whether or not a ground is included in the detection area of the distance sensor is determined based on the posture of the vehicle. When the ground is in the detection area, the reception gain of the distance sensor is decreased and the detection area is reduced such that the ground is not included in the detection area. Further, even when the ground is not included in the detection area, if an obstacle is detected, the detection area is restricted such that a height corresponding to a curbstone is not included in the detection area. Consequently, the curbstone is not detected as the obstacle, so that reliability to detect the obstacle improves.

CITATION LIST

Patent Literature

PTL 1: Unexamined Japanese Patent Publication No. 59-134038

PTL 2: Unexamined Japanese Patent Publication No. 2000-346936

SUMMARY

The present disclosure provides a collision prevention device which uses obstacle sensors. This collision prevention device can avoid missing an obstacle which needs to be detected and which is concerned to cause collision, without erroneously performing brake control against an obstacle, such as a curbstone, whose height is not concerned to cause collision against a vehicle.

The collision prevention device according to the present disclosure is mounted on a vehicle and prevents collision against an obstacle by controlling a driving system of the vehicle. This collision prevention device includes an obstacle sensor, an obstacle detection area setting unit, a detector and a vehicle controller. The obstacle sensor transmits one of a light wave, a radio wave and an ultrasonic wave to a predetermined obstacle detection area, and receives a reflected wave of one of the light wave, the radio wave and the ultrasonic wave. The obstacle detection area setting unit sets the obstacle detection area of the obstacle sensor. The detector detects the obstacle in the obstacle detection area based on a detection result of the obstacle sensor. The vehicle controller controls the driving system of the vehicle based on a result of the detection of the detector, and according to the obstacle detection area set by the obstacle detection area setting unit.

According to the present disclosure, it is possible to avoid missing an obstacle which needs to be detected and which is concerned to cause collision, without erroneously performing brake control against an obstacle, such as a curbstone, whose height is not concerned to cause collision.

DESCRIPTION OF EMBODIMENTS

A problem of a conventional collision prevention device will be briefly described prior to explanation of exemplary embodiments of the present disclosure. When a reception gain is decreased as disclosed in PTL 2, a detection area in a horizontal direction is also generally reduced. Hence, there is a concern that obstacles which need to be detected other than curbstones are not detected.

The collision prevention device according to the exemplary embodiments of the present disclosure will be described in detail below appropriately with reference to the drawings. In this regard, in FIGS. 2, 3 and 8, a vehicle width direction indicates an X axis, a vehicle length direction indicates a Y axis and a direction vertical to a road surface indicates a Z axis.

First Exemplary Embodiment

<Configuration of Collision Prevention Device>

Figure 1:
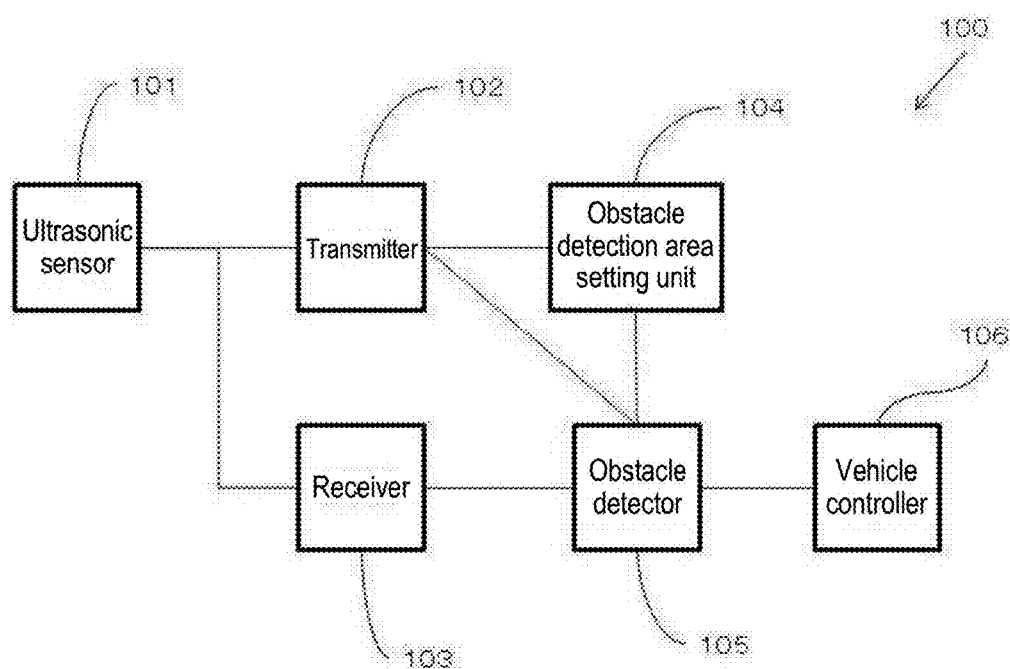
FIG. 1 is a block diagram of a collision prevention device according to a first exemplary embodiment of the present disclosure.
Figure 2:
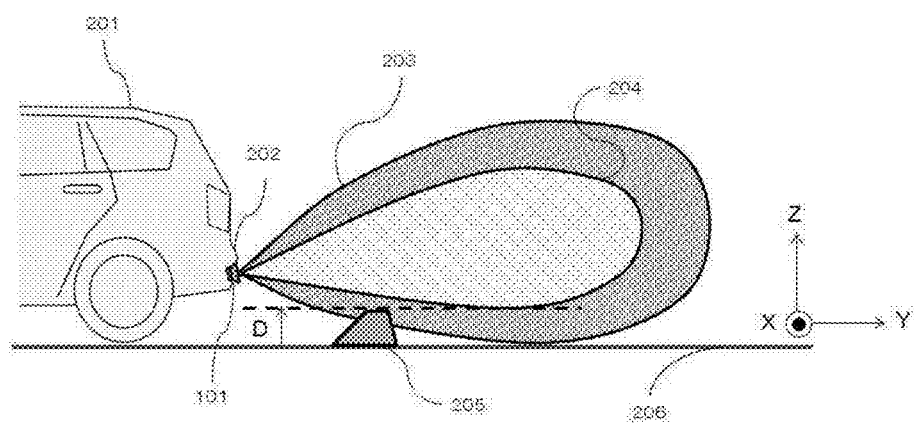
FIG. 2 is a view illustrating obstacle detection areas of an ultrasonic wave transmitted from the collision prevention device according to the first exemplary embodiment of the present disclosure as seen from a side of a vehicle.
Figure 3:
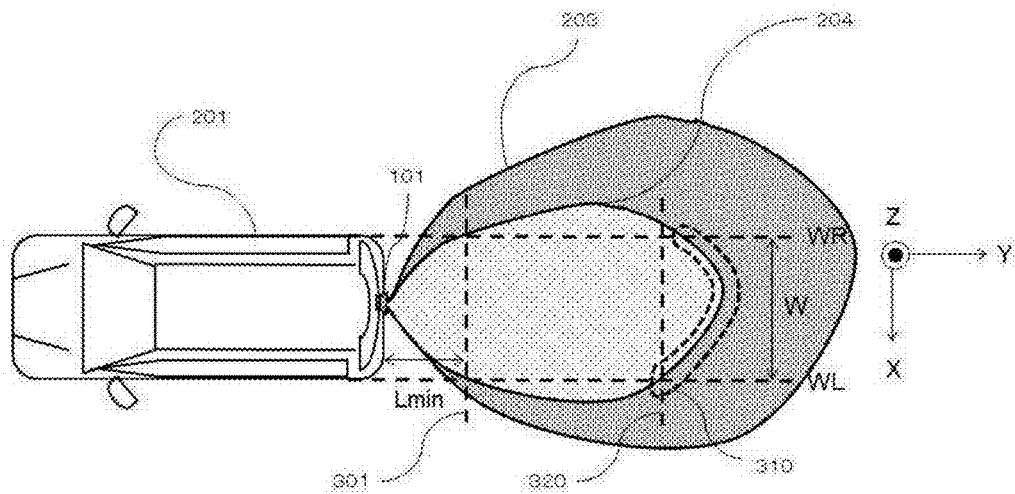
FIG. 3 is a view illustrating obstacle detection areas of an ultrasonic wave transmitted from the collision prevention device according to the first exemplary embodiment of the present disclosure as seen from an above side of a vehicle.

The configuration of collision prevention device 100 according to the first exemplary embodiment of the present disclosure will be described in detail with reference to FIGS. 1, 2 and 3. FIG. 1 is a block diagram of collision prevention device 100 according to the present exemplary embodiment. FIGS. 2 and 3 are views illustrating obstacle detection areas of an ultrasonic wave transmitted from collision prevention device 100 seen from a side of a vehicle in FIG. 2 and seen from an above of the vehicle in FIG. 3.

Collision prevention device 100 includes one ultrasonic sensor 101, transmitter 102, receiver 103, obstacle detection area setting unit (referred to as a setting unit below) 104, obstacle detector (referred to as a detector below) 105 and vehicle controller 106.

Transmitter 102 controls ultrasonic sensor 101 to transmit an ultrasonic wave to a predetermined obstacle detection area at a predetermined transmission timing. Further, transmitter 102 outputs a signal indicating the ultrasonic wave transmission timing to detector 105.

Ultrasonic sensor 101 transmits the ultrasonic wave to the predetermined obstacle detection area under the control performed by transmitter 102. More specifically, ultrasonic sensor 101 transmits the ultrasonic wave by vibrating a piezoelectric element (not illustrated). When receiving a reflected wave of the transmitted ultrasonic wave, ultrasonic sensor 101 converts the received reflected wave (returning ultrasonic wave) into an electrical signal and outputs the electrical signal. As illustrated in FIG. 2, ultrasonic sensor 101 is provided outside vehicle body 201. For example, ultrasonic sensor 101 is provided near bumper 202 at a rear lower portion at an outside of vehicle body 201.

During a period in which ultrasonic sensor 101 does not transmit an ultrasonic wave, receiver 103 outputs to detector 105 a received signal indicating a reception level and a reception timing of the returning ultrasonic wave received by ultrasonic sensor 101.

Detector 105 detects the obstacle in an obstacle detection area based on a detection result of ultrasonic sensor 101. More specifically, detector 105 detects the obstacle according to whether or not the reception level of the signal received from receiver 103 exceeds a predetermined threshold. Further, detector 105 calculates a time difference between the transmission timing of the ultrasonic wave input from transmitter 102 and the reception timing of the returning ultrasonic wave input from receiver 103. Subsequently, detector 105 detects a distance of the obstacle to detector 105 based on the calculated time difference and a principal of triangulation. Detector 105 outputs the detection result together with setting information of the obstacle detection area to vehicle controller 106 when detecting the obstacle. Meanwhile, detector 105 outputs the detection result to setting unit 104 when not detecting the obstacle.

Setting unit 104 outputs to transmitter 102 an instruction signal for performing control to adjust the ultrasonic wave output from ultrasonic sensor 101 to a predetermined obstacle detection area. As illustrated in, for example, FIG. 2, setting unit 104 outputs to transmitter 102 a first instruction signal for causing transmitter 102 to output an ultrasonic wave to first obstacle detection area 204 at transmission gain G1. As illustrated in, for example, FIG. 2, setting unit 104 outputs to transmitter 102 a second instruction signal for causing transmitter 102 to output an ultrasonic wave to second obstacle detection area 203 at transmission gain G2. Second obstacle detection area 203 is an area which has a wider range than that of first obstacle detection area 204 and in which an obstacle can be detected.

As illustrated in FIG. 2, first obstacle detection area 204 is set in advance to an area in which curbstone 205 protruding from road surface 206 cannot be detected. In other words, first obstacle detection area 204 is set to an area of predetermined height D or more having such a margin that an object of a predetermined height or less is not included in this area. Curbstone 205 is approximately several hundreds of mm at maximum, and, for example, transmission gain G1 is set to such a gain that an object whose height is 150 mm or less is not detected. That is, curbstone 205 is an object whose height is predetermined height D or less from road surface 206. In this regard, an object having a height which does not meet a lowermost portion of a bottom of vehicle body 201 can be defined as curbstone 205, so that height D may be set according to vehicle body 201.

Meanwhile, second obstacle detection area 203 almost reaches road surface 206 at a lowermost side (a Z axis lower direction in FIG. 2), and is set to an area in which curbstone 205 can be detected. For example, transmission gain G2 is set to such a gain that an area near road surface 206 is a detection target while securing a certain margin by taking into account a change in a vehicle height of vehicle body 201 caused by a change in boarding conditions. According to such settings, setting unit 104 can set first obstacle detection area 204 in which curbstone 205 cannot be detected, and second obstacle detection area 203 which is wider than first obstacle detection area 204 and in which curbstone 205 can be detected. As described below, setting unit 104 can set the obstacle detection area by performing switching between first obstacle detection area 204 and second obstacle detection area 203.

As illustrated in FIG. 3, first obstacle detection area 204 is preferably set to an area which includes a vehicle width area in minimum detection distance boundary 301 in an area indicated on an XY plane. More specifically, first obstacle detection area 204 is set to an area including vehicle width W sandwiched between line WR indicating a right end of vehicle body 201 in a vehicle width direction, and line WL indicating a left end of vehicle body 201 in the vehicle width direction. Thus, first obstacle detection area 204 is extended outward compared to line WR and line WL at a side exceeding minimum detection distance boundary 301 and reaching maximum detection distance boundary 310. Consequently, it is possible to reliably detect an obstacle in an area in which the vehicle moves forward and backward in first obstacle detection area 204 and which reaches maximum detection distance boundary 310. In addition, the maximum detection distance boundary may be maximum detection distance boundary 310 illustrated in FIG. 3, yet may be defined in other ways. As indicated by, for example, line 320 in FIG. 3, the maximum detection distance boundary may be defined as a farthest position from vehicle body 201 by a line which connects portions of first obstacle detection area 204 extending outward compared to line WR and line WL and which is parallel to an X axis.

Meanwhile, minimum detection distance boundary 301 depends on a pulse transmission time of an ultrasonic wave transmitted by ultrasonic sensor 101. More specifically, minimum detection distance boundary 301 is a line which is apart from the vehicle by minimum detection distance Lmin in a Y axis direction and which is parallel to the X axis.

Minimum detection distance Lmin is calculated according to a following relational equation.

$$\text{Minimum detection distance Lmin} = ((\text{transmission pulse width} + \text{reverberation continuation time}) \times \text{sound velocity})/2 \quad [\text{Equation 1}]$$

Vehicle controller 106 controls a driving system of the vehicle based on a result of the detection of detector 105, and according to the obstacle detection area set by setting unit 104. More specifically, vehicle controller 106 performs brake control when detector 105 detects an obstacle in first obstacle detection area 204, and performs torque suppression control when detectors 105 detects the obstacle in second obstacle detection area 203. The driving system is, for example, an accelerator or the brake. As specific processing, for example, vehicle controller 106 sets an upper limit of a vehicle velocity by instructing a throttle valve opening upper limit for controlling an accelerator opening as torque suppression control. Alternatively, vehicle controller 106 applies the brake by instructing a change in a hydraulic pressure of a brake cylinder for controlling a brake pad.

The vehicle controller controls the driving system of the vehicle according to the detection result of the detector.

<Operation of Collision Prevention Device>

Figure 4:
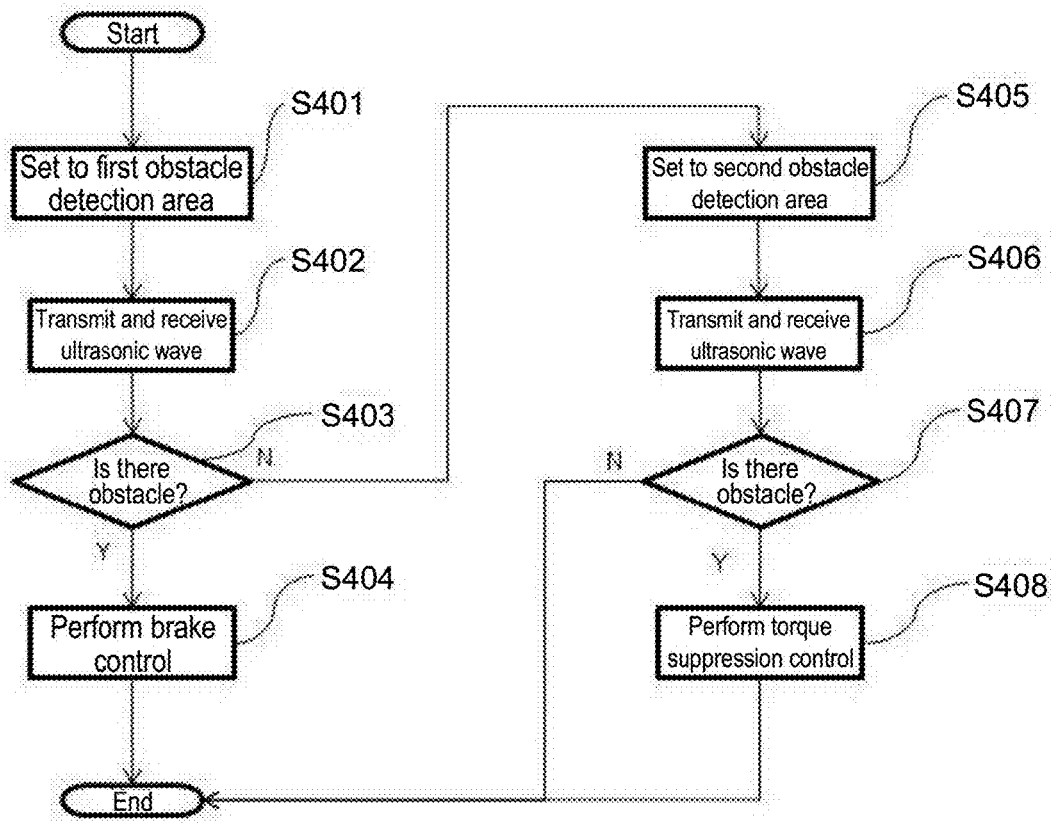
FIG. 4 is a flowchart illustrating an operation of the collision prevention device according to the first exemplary embodiment of the present disclosure.

Next, an operation of collision prevention device 100 will be described in detail below with reference to FIG. 4. FIG. 4 is a flowchart illustrating the operation of collision prevention device 100.

First, setting unit 104 sets the obstacle detection area of ultrasonic sensor 101 to first obstacle detection area 204 in which curbstone 205 cannot be detected (S401). For example, setting unit 104 outputs an instruction signal of transmission gain G1 to transmitter 102. In this regard, a setting method is not limited to this. A trigger to start this processing is arbitrary, yet it is desirable to start this processing when collision prevention device 100 is activated or when vehicle body 201 starts moving backward. More specifically, this processing is triggered when, for example, a parking vehicle is ignited on, is geared rearward, or is operated in a forward parking mode or a backward parking mode. However, the trigger is not limited to this. Thus, this vehicle control is performed only in case where an emergency brake operation needs to be performed, so that it is possible to reduce a concern that passengers feel uncomfortable for collision prevention measures.

Subsequently, ultrasonic sensor 101 transmits an ultrasonic wave to first obstacle detection area 204, and performs reception processing of a returning ultrasonic wave (S402).

Next, collision prevention device 100 determines whether or not there is an obstacle in first obstacle detection area 204 (S403). More specifically, detector 105 determines whether or not there is the obstacle by determining whether or not a received signal of the returning ultrasonic wave received at receiver 103 from ultrasonic sensor 101 exceeds the predetermined threshold.

When it is determined that the detector 105 has detected the obstacle in first obstacle detection area 204 (Y in S403), vehicle controller 106 performs brake control based on a determination result (S404).

Meanwhile, when detector 105 does not detect the obstacle in first obstacle detection area 204 (N in S403), setting unit 104 changes first obstacle detection area 204 to second obstacle detection area 203 in which the curbstone can be detected (S405). For example, setting unit 104 outputs an instruction signal of transmission gain G2 to transmitter 102, yet a setting method is not limited to this.

Subsequently, collision prevention device 100 transmits and receives ultrasonic waves (S406). More specifically, ultrasonic sensor 101 transmits an ultrasonic wave to second obstacle detection area 203, and performs reception processing of a returning ultrasonic wave. When whether or not there is the obstacle is determined based on a reception level (amplitude) of a received signal, if a plurality of types of transmission waves is transmitted at an identical transmission timing, it is concerned that an interference causes erroneous detection. Hence, as described above, transmission timings of a transmission wave of first obstacle detection area 204 and a transmission wave of second obstacle detection area 203 are isolated from each other.

Next, detector 105 determines whether or not there is the obstacle, based on whether or not the received signal of the returning ultrasonic wave received by receiver 103 from ultrasonic sensor 101 exceeds the predetermined threshold (S407).

When detector 105 determines that there is the obstacle in second obstacle detection area 203 (Y in S407), vehicle controller 106 performs torque suppression control based on a result of this determination (S408).

The above processing is repeated. According to the above operation, collision prevention device 100 provides a following effect.

In first obstacle detection area 204, curbstone 205 illustrated in FIG. 2 is excluded from a detection target. Hence, it is learned that the object detected in S403 is an obstacle which is concerned to cause collision. As is clear from FIG. 3, the obstacle detected in first obstacle detection area 204 is close in a traveling direction of vehicle body 201 compared to second obstacle detection area 203 and is highly likely to cause collision. By performing brake control as in S404 for the obstacle which is concerned to cause collision, it is possible to quickly apply the brake and avoid the collision.

The object detected in second obstacle detection area 203 is the object which is not detected in first obstacle detection area 204. Hence, it is likely that the object is an obstacle which is outside a range of first obstacle detection area 204 in FIG. 3 and which is concerned to cause collision, or that the object is curbstone 205 which is below first obstacle detection area 204 in FIG. 2 and which is not concerned to cause collision.

If the detected object is the obstacle, it is relatively unlikely that the obstacle in first obstacle detection area 204 causes collision. Meanwhile, when the detected object is curbstone 205, a driver cannot see the object at a back side, and therefore is likely to accelerate to quickly move backward. Hence, even if the object detected in second obstacle detection area 203 is one of the obstacle and the curbstone, it is preferable to perform torque suppression control in S408.

When the object detected in second obstacle detection area 203 is the obstacle, collision is less likely to occur, compared to a case where the obstacle is detected in first obstacle detection area 204. Hence, a sudden brake which makes the passengers feel uncomfortable is not applied. However, by performing torque suppression control in S408, it is possible to avoid a concern of collision caused by rapid acceleration such as erroneous pedaling.

Meanwhile, when the object detected in second obstacle detection area 203 is curbstone 205, if the driver accelerates to quickly move backward, the vehicle may unintentionally run on curbstone 205. However, performing torque suppression control in S408 reduces the possibility of making the passengers feel uncomfortable due to the vehicle running on the curbstone.

As described above, transmission timings of a transmission wave of first obstacle detection area 204 and a transmission wave of second obstacle detection area 203 are isolated from each other. Generally, an ultrasonic wave emitted from an ultrasonic sensor is slow. Therefore, in a system which outputs a plurality of types of transmission waves, it takes approximately several tens of msec to complete a series of processing of first obstacle detection area 204 and second obstacle detection area 203. In this case, vehicle body 201 is likely to move approximately several tens of centimeters to several meters before collision prevention device 100 finishes one operation, and, during this operation, there is a concern that vehicle control is not performed in time and collision is likely to occur. Hence, by applying a brake early in case of an area such as first obstacle detection area 204 in which there is an obstacle which is concerned to cause collision, it is possible to suppress erroneous detection of curbstone 205. Further, it is possible to reduce a concern of collision against an obstacle in an area in which an emergency brake operation needs to be performed and which is near the vehicle in a vehicle traveling direction.

In addition, as described above, setting unit 104 sends to transmitter 102 an instruction to change a transmission gain in order to set first obstacle detection area 204 and second obstacle detection area 203. However, other methods may be employed. For example, configurations illustrated in FIGS. 5 and 6 may be employed.

Figure 5:
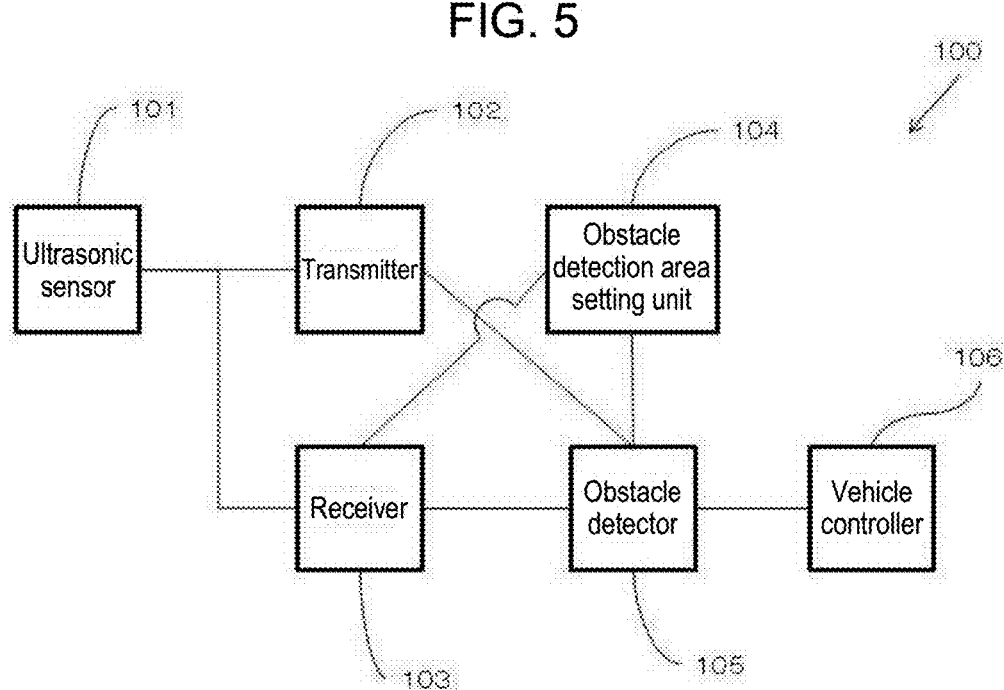
FIG. 5 is a block diagram of another collision prevention device according to the first exemplary embodiment of the present disclosure.

According to the configuration illustrated in FIG. 5, setting unit 104 sends to receiver 103 an instruction to change a reception gain in order to set first obstacle detection area 204 and second obstacle detection area 203. For example, setting unit 104 instructs an amplification factor of a received signal and changes a gain. This configuration may be employed.

Figure 6:
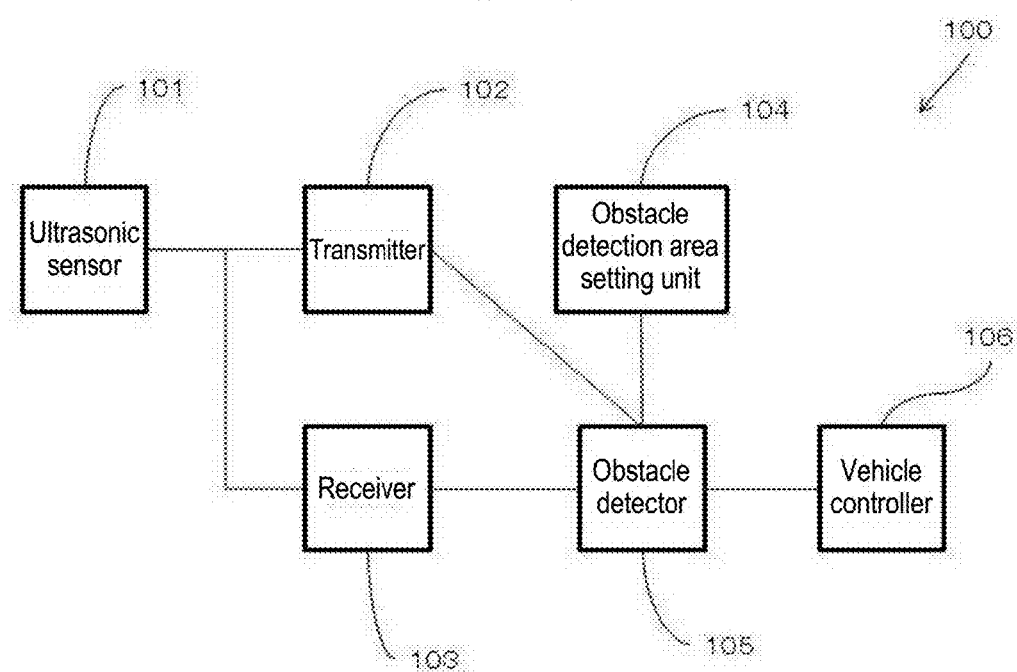
FIG. 6 is a block diagram of still another collision prevention device according to the first exemplary embodiment of the present disclosure.

According to the configuration illustrated in FIG. 6, setting unit 104 sends an instruction to change a predetermined threshold of obstacle detection processing to detector 105 to set first obstacle detection area 204 and second obstacle detection area 203. Thus, by changing the threshold, it is possible to change an obstacle detection area. For example, when whether or not an obstacle is detected is determined, if the threshold is increased and even if a received signal from receiver 103 is identical, the obstacle is not substantially detected. Thus, this state is similar to a state where an area is made small since the obstacle is out of a detection area.

Second Exemplary Embodiment
<Configuration of Collision Prevention Device>

Figure 7:
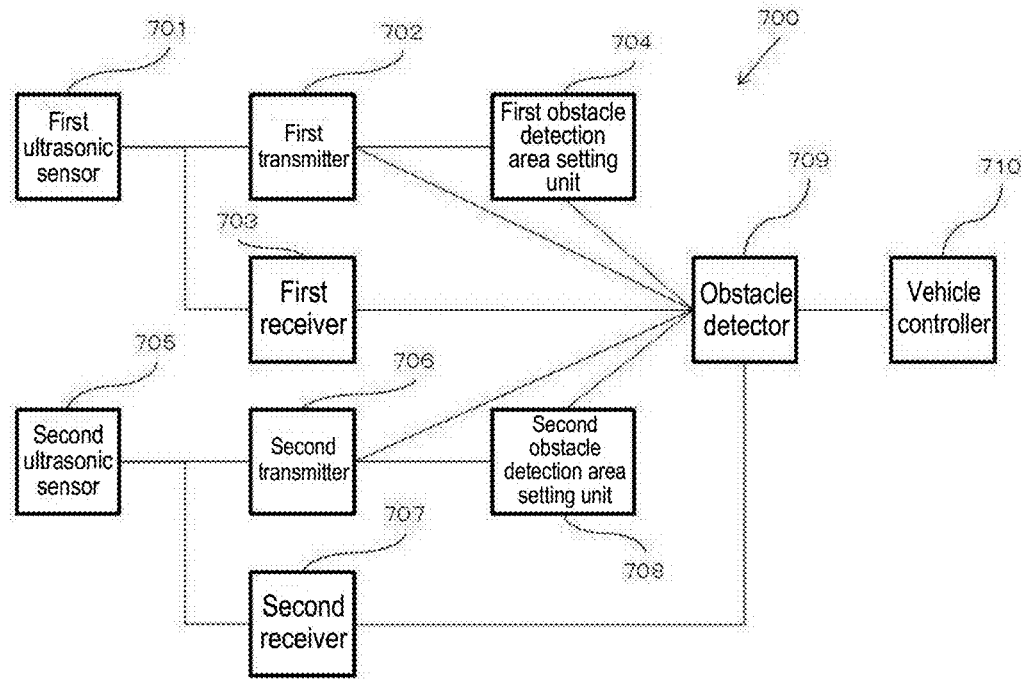
FIG. 7 is a block diagram of a collision prevention device according to a second exemplary embodiment of the present disclosure.
Figure 8:
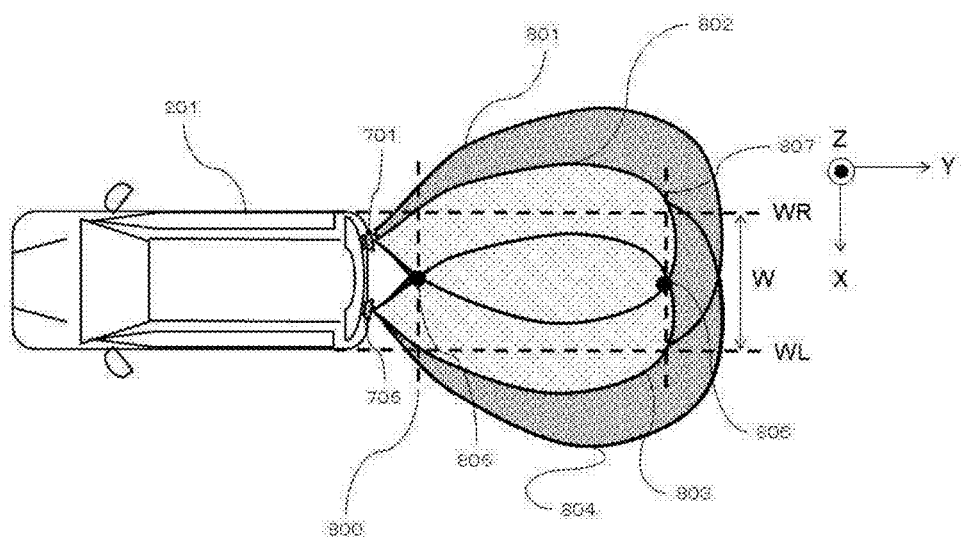
FIG. 8 is a view illustrating obstacle detection areas of an ultrasonic wave transmitted from the collision prevention device according to the second exemplary embodiment of the present disclosure as seen from an above side of a vehicle.

The configuration of collision prevention device 700 according to the second exemplary embodiment of the present disclosure will be described in detail with reference to FIG. 7. FIG. 7 is a block diagram of collision prevention device 700 according to the present exemplary embodiment. FIG. 8 is a view illustrating an obstacle detection area of an ultrasonic wave transmitted from collision prevention device 700 as seen from an above side of a vehicle. In this regard, only reference numerals for components employing the same configurations and functions as those in FIGS. 1 and 3 will be changed in FIGS. 7 and 8 and these components will not be described.

In FIG. 7, pluralities of ultrasonic sensors 101, transmitters 102, receivers 103 and setting units 104 in FIG. 1 are provided. First ultrasonic sensor 701 and second ultrasonic sensor 705 correspond to ultrasonic sensor 101, and first transmitter 702 and second transmitter 706 correspond to transmitter 102. First receiver 703 and second receiver 707 correspond to receiver 103, and first obstacle detection area setting unit (referred to as a first setting unit below) 704 and second obstacle detection area setting unit (referred to as a second setting unit below) 708 correspond to setting unit 104.

Obstacle detector (referred to as a detector below) 709 detects obstacles in respective obstacle detection areas based on received signals from first receiver 703 and second receiver 707. Vehicle controller 710 controls a driving system of a vehicle according to a detection result of detector 709. Further, first setting unit 704 and second setting unit 708 set the obstacle detection areas based on the detection result of detector 709. More specifically, first setting unit 704 and second setting unit 708 set the obstacle detection areas by taking into account detection results of neighboring ultrasonic sensors, too.

Further, as illustrated in FIG. 8, a synthesized area of first obstacle detection area 802 of first ultrasonic sensor 701 and first obstacle detection area 803 of second ultrasonic sensor 705 is preferably set to an area which includes a vehicle width area in minimum detection distance boundary 800 on an XY plane. More specifically, this synthesized area is set to an area including vehicle width W sandwiched between line WR indicating a right end of vehicle body 201 in the vehicle width direction, and line WL indicating a left end of vehicle body 201 in the vehicle width direction.

Nearest point 805 is a point of a portion at which a plurality of first obstacle detection areas 802, 803 overlaps and which is the closest to vehicle body 201 on a Y axis, and minimum detection distance boundary 800 is a line which passes on nearest point 805 and is parallel to an X axis. Meanwhile, farthest point 806 is a point of a portion at which a plurality of first obstacle detection areas 802, 803 overlaps and which is the farthest from the vehicle in a Y axis direction. Maximum detection distance boundary 807 is a line which passes on farthest point 806 and is parallel to the X axis. Consequently, it is possible to reliably detect an obstacle in a synthesized area of first obstacle detection areas 802, 803 in which vehicle body 201 moves straightforward and backward and which reaches maximum detection distance boundary 807.

In this regard, an arrangement and a number of ultrasonic sensors are not limited to those in FIG. 8 as long as following conditions are satisfied. A synthesized area of each obstacle detection area in a state where a gain of each ultrasonic sensor mounted on vehicle body 201 is decreased needs to completely cover an area surrounded by a line (minimum detection distance boundary 800 in FIG. 8) which passes on nearest point 805 and is parallel to the X axis, a line (maximum detection distance boundary 807 in FIG. 8) which passes on farthest point 806 and is parallel to the X axis, and an extension line (line WR and line WL in FIG. 8) in the Y axis direction of a vehicle width. Consequently, it is possible to prevent detection error of an obstacle in an area in which collision is highly concerned to occur.

<Operation of Collision Prevention Device>

Figure 9:
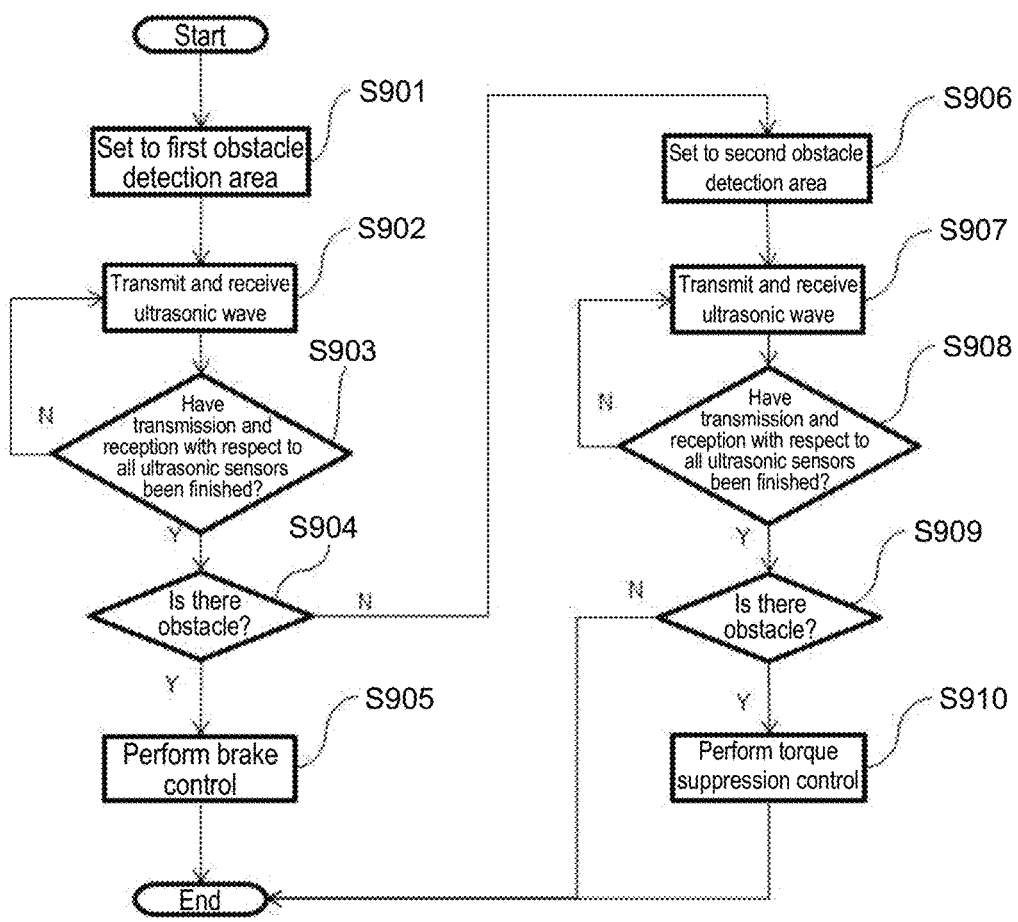
FIG. 9 is a flowchart illustrating an operation of the collision prevention device according to the second exemplary embodiment of the present disclosure.

Next, an operation of collision prevention device 700 will be described in detail below with reference to FIG. 9. FIG. 9 is a flowchart illustrating the operation of collision prevention device 700.

First, first obstacle detection area setting unit 704 and second setting unit 708 set obstacle detection areas of first ultrasonic sensor 701 and second ultrasonic sensor 705 to first obstacle detection areas 802, 803 in which a curbstone cannot be detected, respectively (S901).

Subsequently, first ultrasonic sensor 701 transmits an ultrasonic wave to first obstacle detection area 802, and performs reception processing of a returning ultrasonic wave. Subsequently, second ultrasonic sensor 705 transmits an ultrasonic wave to first obstacle detection area 803, and performs reception processing of a returning ultrasonic wave (S902). When whether or not there is the obstacle is determined based on a reception level (amplitude) of a received signal, if a plurality of types of transmission waves is transmitted at an identical transmission timing, it is concerned that an interference causes erroneous detection. Hence, timings to transmit ultrasonic waves are made different between first ultrasonic sensor 701 and second ultrasonic sensor 705 to transmit the ultrasonic waves.

Next, as illustrated in FIG. 9, collision prevention device 700 determines whether or not transmission reception processing with respect to first ultrasonic sensor 701 and second ultrasonic sensor 705 has been finished (S903). In case where the transmission and reception processing with respect to one of these ultrasonic sensors has not been finished (N in S903), the flow returns to processing in S902. In case where the transmission and reception processing with respect to both of the ultrasonic sensors has been finished (Y in S903), collision prevention device 700 determines whether or not there is an obstacle in the synthesized area of the first obstacle detection areas (S904). More specifically, detector 709 determines whether or not there is the obstacle based on whether or not at least one of a received signal of a returning ultrasonic wave received at first receiver 703 from first ultrasonic sensor 701 and a received signal of a returning ultrasonic wave received at second receiver 707 from second ultrasonic sensor 705 exceeds a predetermined threshold.

When it is determined that the detector 709 has detected the obstacle in the synthesized area of first obstacle detection areas 802, 803 (Y in S904), vehicle controller 106 performs brake control based on a result of this determination (S905).

Meanwhile, when it is determined that there is no obstacle (N in S904), first setting unit 704 and second setting unit 708 set obstacle detection areas of first ultrasonic sensor 701 and second ultrasonic sensor 705 to second obstacle detection areas 801, 804 in which curbstone 205 can be detected, respectively (S906). For example, first setting unit 704 and second setting unit 708 output instruction signals of transmission gain G2 to first transmitter 702 and second transmitter 706, respectively. A setting method is not limited to this as described in the first exemplary embodiment.

Subsequently, first ultrasonic sensor 701 and second ultrasonic sensor 705 transmit ultrasonic waves to second obstacle detection areas 801, 804, respectively and receive returning ultrasonic waves (S907).

Next, as illustrated in FIG. 9, collision prevention device 700 determines whether or not the transmission reception processing with respect to first ultrasonic sensor 701 and second ultrasonic sensor 705 has been finished (S908). In case where the transmission and reception processing with respect to one of these ultrasonic sensors has not been finished (N in S908), the flow returns to processing in S907. In case where the transmission and reception processing with respect to both of the ultrasonic sensors has been finished (Y in S908), collision prevention device 700 determines whether or not there is an obstacle in the synthesized area of the second obstacle detection areas (S909). More specifically, detector 709 determines whether or not there is the obstacle based on whether or not at least one of the received signal of the returning ultrasonic wave received at first receiver 703 from first ultrasonic sensor 701 and the received signal of the returning ultrasonic wave received at second receiver 707 from second ultrasonic sensor 705 exceeds a predetermined threshold.

When it is determined that there is the obstacle (Y in S909), collision prevention device 700 performs torque suppression control as illustrated in FIG. 9 (S910). More specifically, vehicle controller 106 performs torque suppression control based on the determination result that detector 709 has detected the obstacle in the synthesized area of the second obstacle detection areas.

The above processing is repeated. As described above, collision prevention device 700 provides a following effect in addition to an effect of collision prevention device 100 according to the first exemplary embodiment.

Curbstone 205 is excluded as a detection target from the synthesized area of first obstacle detection areas 802, 803. Hence, the object detected in S904 is an obstacle which is concerned to cause collision. As is clear from FIG. 8, the obstacle detected in the synthesized area of first obstacle detection areas 802, 803 is close in a traveling direction of vehicle body 201 compared to the synthesized area of second obstacle detection areas 801, 804 and is highly likely to cause collision. By performing brake control as in S905 for an obstacle which is highly concerned to cause collision, it is possible to quickly apply the brake and avoid the collision.

As described in the first exemplary embodiment, an ultrasonic wave emitted from an ultrasonic sensor is slow. Therefore, in a system which outputs a plurality of types of transmission waves, it takes approximately several tens of msec to complete a series of processing of first obstacle detection area 204 and second obstacle detection area 203. Further, a plurality of ultrasonic sensors is provided in the present exemplary embodiment. Therefore, finishing transmission and reception processing on all ultrasonic sensors from the first obstacle detection areas and the second obstacle detection areas takes a time which is a multiple of approximately several tens of msec×a number of sensors which is a time taken to perform processing on one ultrasonic sensor. That is, the vehicle is likely to move approximately several tens of centimeters to several meters before collision prevention device 700 finishes one operation, and, during this operation, there is a concern that vehicle control is not performed in time and collision may occur. Hence, by applying the brake early with respect to areas such as first obstacle detection areas 802, 803 in which collision may occur, it is possible to prevent erroneous detection of curbstone 205. Further, it is possible to reduce a concern of collision against an obstacle in an area in which an emergency brake operation needs to be performed and which is near the vehicle in a vehicle traveling direction.

Similarly, even in areas such as second obstacle detection areas 801, 804 in which collision is less likely to occur compared to first obstacle detection areas 802, 803, the vehicle is likely to move approximately several meters before collision prevention device 700 finishes one operation. Therefore, brake control is not likely to be performed in time due to detection of an obstacle in first obstacle detection areas 802, 803. Hence, by performing torque suppression control in second obstacle detection areas 801, 804, it is possible to secure a time for processing (S901 to S905) to perform the brake control in first obstacle detection areas 802, 803. Consequently, it is possible to enhance reliability of the operation of collision prevention device 700.

In this regard, not only settings of a transmission gain but also settings of a reception gain and a threshold described in the first exemplary embodiment with reference to FIG. 5 are applicable to settings of the obstacle detection areas in the present exemplary embodiment.

Each exemplary embodiment of the present disclosure has been described above. However, types, arrangements and numbers of members are not limited to the above-described exemplary embodiments, and the present disclosure can be optionally changed without departing from the scope of the disclosure by optionally replacing components with components which provide equivalent functions and effects.

For example, in the first exemplary embodiment and the second exemplary embodiment, it is described that collision prevention devices 100, 700 are used when a vehicle moves backward. However, collision prevention devices 100, 700 may be used when the vehicle moves forward. By providing ultrasonic sensors outside vehicle body 201, i.e., at, for example, a front bumper, it is possible to perform identical processing when the vehicle moves forward and when the vehicle moves backward.

Further, in the first exemplary embodiment and the second exemplary embodiment, ultrasonic sensors are used as examples of obstacle sensors which detect obstacles. However, obstacle sensors such as light wave sensors and radio wave sensors other than ultrasonic sensors may be used as long as the obstacle sensors transmit signal waveforms to a predetermined obstacle detection area and receive reflected waves of the signal waveforms. Particularly, these obstacle sensors are useful for sensors whose signal velocity is slow to such a degree that, while a vehicle moves a little distance (e.g. approximately tens of centimeters to several meters), a loop of a series of operations of obstacle detection processing and collision prevention processing is not performed in time, and collision is concerned to occur.

Further, two ultrasonic sensors are provided in the second exemplary embodiment. However, three or more ultrasonic sensors may be provided. For example, four ultrasonic sensors may be provided near rear and front bumpers. In this case, it takes twice the time for the operation in the second exemplary embodiment, and it is highly concerned that the driving system of the vehicle is not controlled in time. Hence, a range of first obstacle detection areas may be made broader as a number of ultrasonic sensors attached to vehicle body 201 is larger so that the driving system of the vehicle can be controlled in time to avoid collision.

The collision prevention device according to the present disclosure can be used for devices which prevent collision against obstacles present around vehicles.

The invention claimed is:

1. A collision prevention device for preventing collision between a vehicle and an obstacle by controlling a driving system of the vehicle, the collision prevention device comprising:
   an obstacle sensor which transmits one of a light wave, a radio wave and an ultrasonic wave to a predetermined obstacle detection area, and receives a reflected wave of the one of the light wave, the radio wave and the ultrasonic wave;
   an obstacle detection area setting unit which sets the obstacle detection area of the obstacle sensor;
   a detector which detects the obstacle in the obstacle detection area based on a detection result of the obstacle sensor; and
   a vehicle controller which controls the driving system of the vehicle based on a result of the detection of the detector, and according to the obstacle detection area set by the obstacle detection area setting unit,
   wherein the obstacle detection area setting unit sets the obstacle detection area by performing switching between a first obstacle detection area and a second obstacle detection area, the first obstacle detection area being an area in which an object having a predetermined height or less from a road surface cannot be detected, and the second obstacle detection area being an area which is wider than the first obstacle detection area and in which the object can be detected; and
   the vehicle controller performs brake control when the detector detects the obstacle in the first obstacle detection area, and performs torque suppression control when the detector detects an obstacle in the second obstacle detection area.

2. The collision prevention device according to claim 1, wherein, when the detector does not detect the obstacle in the first obstacle detection area, the obstacle detection area setting unit changes the obstacle detection area from the first obstacle detection area to the second obstacle detection area.

3. The collision prevention device according to claim 2, wherein the obstacle detection area setting unit sets the obstacle detection area to the first obstacle detection area when the collision prevention device is activated, when the vehicle starts moving forward or when the vehicle starts moving backward.

4. The collision prevention device according to claim 1, wherein the first obstacle detection area is set to an area which includes a vehicle width area at a minimum detection distance boundary of the obstacle sensor.

5. The collision prevention device according to claim 1, further comprising a plurality of the obstacle sensors.

6. The collision prevention device according to claim 5, wherein a synthesized area of the first obstacle detection area of each of the plurality of the obstacle sensors is set to an area which includes a vehicle width area in a minimum detection distance boundary of each of the plurality of the obstacle sensors.

7. The collision prevention device according to claim 6, wherein the synthesized area includes an area surrounded by the minimum detection distance boundary of each of the plurality of the obstacle sensors, a maximum detection distance boundary of each of the plurality of the obstacle sensors, and the vehicle width area.

8. The collision prevention device according to claim 1, wherein the obstacle detection area setting unit sets the obstacle detection area by controlling a gain or controlling a detection threshold.

9. The collision prevention device according to claim 1, wherein the obstacle sensor transmits the ultrasonic wave and receives the reflected wave of the ultrasonic wave.

* * * * *